Sept. 11, 1962
G. BYERS
3,053,005
EASY-TO-CLEAN FISH BAG
Filed Oct. 17, 1960
2 Sheets-Sheet 1
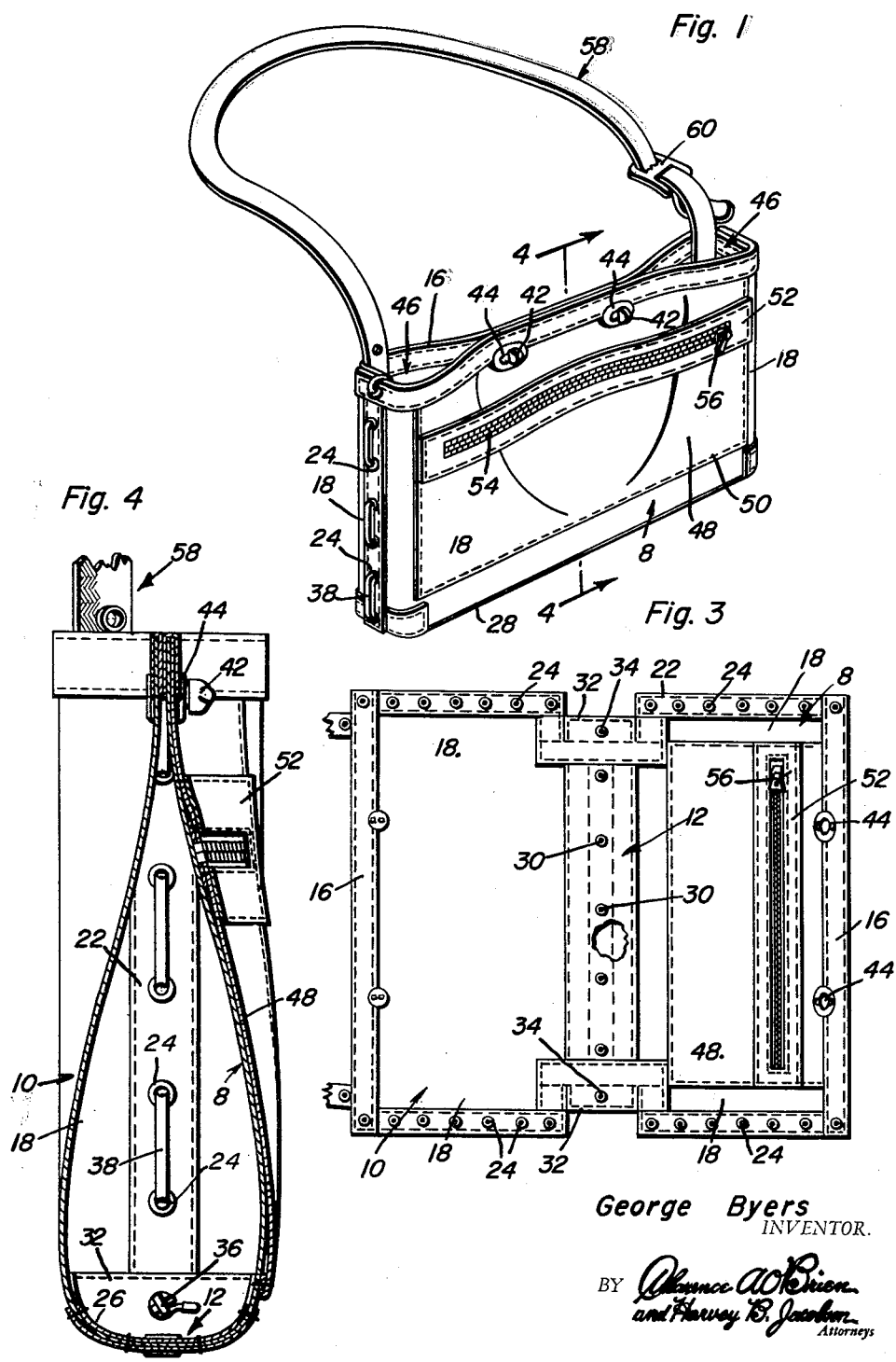
George Byers
INVENTOR.

Sept. 11, 1962  G. BYERS  3,053,005
EASY-TO-CLEAN FISH BAG
Filed Oct. 17, 1960  2 Sheets-Sheet 2
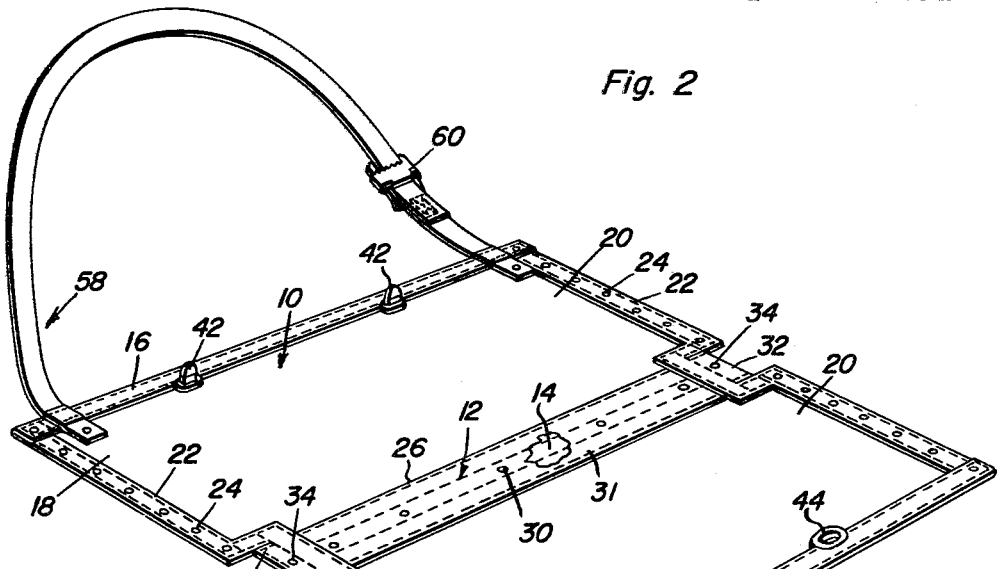
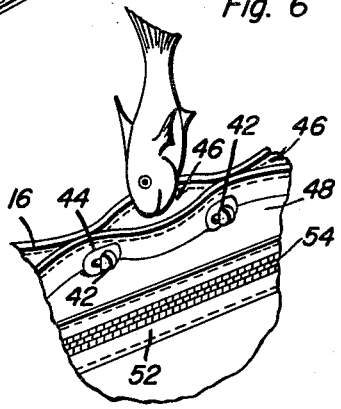
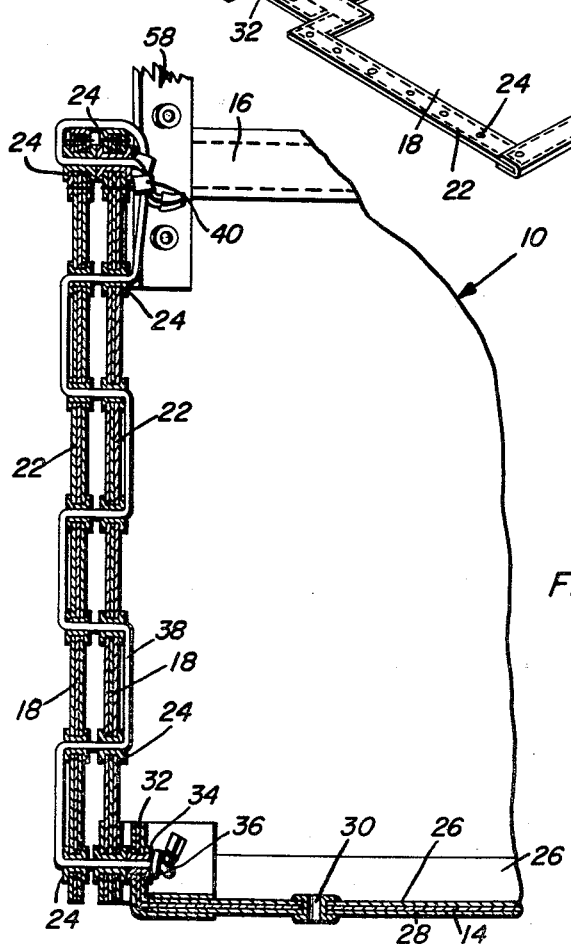
George Byers
INVENTOR.

United States Patent Office 3,053,005
Patented Sept. 11, 1962

3,053,005
EASY-TO-CLEAN FISH BAG
George Byers, Porterville, Calif.
(P.O. Box 382, Springville, Calif.)
Filed Oct. 17, 1960, Ser. No. 63,096
1 Claim. (Cl. 43—55)

This invention relates to new and useful improvements in a bag or creel for live fish and which is provided with a shoulder strap for suspending the bag when carried by an angler and has reference, more particularly stated, to a number of features and improvements all of which mutually contribute in providing an easy-to-clean fish bag.

Briefly summarized, the bag is characterized by canvas front, back, bottom and end walls which are so arranged and separably connectible that when the end walls are disconnected they may be turned inside out, so to speak, and spread out flat on a surface in a manner to allow the angler to permit the then-exposed interior surfaces to be cleansed, aired and dried so as to lengthen the life of the bag, reduce objectionable odors to a minimum, and to thus keep the bag clean for acceptable use.

In carrying out the invention the mouth of the bag is separably closed in a novel manner simply by using turn-buttons on one main wall and separably connecting the same with grommets on the other main wall, the properly paired turn-buttons and grommets being spaced apart with the spaces therebetween sufficiently large to thus allow the bag's mouth to be sufficiently closed at all times while at the same time having openings of sufficient size to allow the fisherman to slip the fish, promptly after they are caught, into the receptacle portion of the bag.

The bag is also unique in that the exterior of the front wall is provided with a patch pocket having an accessible slide fastener, said pocket being thus suitably adapted to protectively contain and carry fishing tackle and accessories.

A highly significant improvement has to do with the transverse or end walls each wall being made up of companion flaps. The flaps are overlapped and provided with aligned eyelets and the eyelets serve to accommodate a readily applicable and removable shoe lace. With the shoe laces properly laced through the cooperating eyelets the end walls are such that they facilitate ready removal when necessary or desired and then opening up the bag and spreading its component parts flatwise for cleaning, airing and drying.

Novelty is also predicated on the readily openable and closeable flaps providing the end walls and wherein the transverse ends of the bottom wall have bendable end tabs which are also provided with eyelets and which eyelets serve to join the tabs to the lower ends of the flaps and to, in this manner, provide a highly practical and satisfactory construction.

A further improvement resides in the bag or creel having a shoulder strap, provided with the readily openable and closeable mouth, the laced-together end wall flaps and end tabs, and wherein, in addition, the bottom is provided with drainage openings or holes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a ready-to-use fisherman's creel or fishing bag embodying the invention and which shows the aforementioned features and improvements.

FIG. 2 is also a view in perspective which shows the bag turned inside out and wherein the several walls, front, back and bottom, are illustrated flatwise in the spread position to handle the aforementioned cleansing, airing and drying result.

FIG. 3 is a view on a smaller scale showing what the other side (normally the outer side) of the structure (FIG. 2) looks like when several walls are spread out for cleaning in a common plane.

FIG. 4 is an enlarged view in section and elevation taken on the vertical section line 4—4 of FIG. 1.

FIG. 5 is an enlarged detail section showing the registering eyelets and the position of the overlapping flaps with the shoe lace in its intended position.

FIG. 6 is a fragmentary view in perspective stressing the openings between the mouth-closing fasteners which allow the fish to be dropped through the openings into the receptacle portion of the bag.

Referring to the FIGURES of the drawings it will be observed that the ready-to-use bag or creel is illustrated in FIG. 1 and the unfolded bag in spread or flat form is illustrated in FIG. 2. Considering these two showings in conjunction with FIG. 3 it will be seen that the canvas or equivalent blank is generally rectangular in form (FIGS. 2 and 3) and is cut-out to provide a generally rectangular front wall 8, a corresponding back wall 10 and an intervening bottom wall 12 which is relatively narrow and which joins the adjacent lengthwise edges of the two walls 8 and 10. This bottom wall may also be identified as a foldable web 14 (FIGS. 4 and 5). The longitudinal edge portions of the walls 8 and 10 are edged with plastic or equivalent bindings 16. The transverse end portions of these front and back walls are conveniently denoted at 18, at the left in FIG. 2, and 20 at the right and these are foldable inwardly into overlapping relationship and are defined here as flaps. Here again plastic or equivalent bindings 22 are stitched along the free edge portions of the flaps. These flaps are also provided with registerable eyelets 24 (both left and right) which function as best illustrated in FIG. 5. As also shown in FIG. 5 the numeral 26 designates an interior ply of plastic material and 28 an exterior ply. The edge portions of these plies (FIG. 2) are stitched together at 31 with the aforementioned bottom wall or web 14 interposed therebetween. These several cooperating plies define not only a durable bottom wall; said wall is provided with longitudinally spaced grommets 30 which provide drainage holes. With further reference to FIG. 5 it will be noted that at the respective transverse ends of this bottom wall freely bendable tabs 32 are provided and these tabs are provided with additional eyelets 34 which register with the bottommost eyelets 24 in the turned in flaps. In bag-forming relationship the bottom eyelets 34 and 24 register to accommodate a lower end portion of a shoe lace or the like which is passed through the eyelets and a knot 36 is tied for retaining the lace. The median portion of the lace which may be denoted at 38 is threaded through the eyelets 24. The uppermost portion of the lace is tied, as at 40 and in this manner the several components, the tabs 32 and flaps 18 and 20 are laced and held together. Each end wall therefore is made up of the overlapping laced flaps and the up-folded tab 32, a single lace serving to separably join these several components together.

The aforementioned "open mouth" feature is perhaps best shown in FIGS. 1 and 6. This is accomplished by providing rotatably mounted turn-buttons 42 along the left hand marginal edge of the back wall 10, these buttons arranged to pass through grommets 44 on the corresponding longitudinal wall at the extreme right in FIG. 2 which grommets serve as keepers. The turn-buttons and grommets are sufficiently spaced that openings 46 are provided (FIGS. 1 and 6) allowing the user to conveniently drop a fish through a selected opening 46 into the receptacle portion of the bag, that is, when the bag is in use as illustrated in FIG. 1.

The numeral 48 designates a rectangular patch of canvas or the like which is superimposed against the exterior side of the front wall and is marginally stitched in place as at 50. This construction provides a patch pocket for tackle and miscellaneous small articles. The mouth of the pocket is defined by providing a slit in the patch and then attaching a reinforcing strip of plastic in place. The plastic strip is also formed with a slit and slide fastener means is embodied in this construction to open and close the mouth of the pocket. The slide fastener may be referred to as a well known Zipper embodying cooperating tracks 54 for the manually actuatable slide fastener 56.

The numeral 58 designates a shoulder strap which may be suitably constructed and attached and which is adjustable by way of an appropriate buckle 60.

As before mentioned the construction is such that the bag is easily cleanable. By removing the shoe laces 38 (which requires untying the knots 36 and 40) the flaps forming the end walls may be disconnected and spread apart. Then the front, back and bottom walls 8, 10 and 12 may be spread out flat as illustrated in FIG. 2 for airing, scrubbing and drying. Stated otherwise, the bag ends are laced together by simply passing the shoe laces through the eyelets in the end flaps and tabs in the manner shown in FIG. 5. This step can be quickly and easily taken care of. By untying the laces and pulling them out the bag unfolds to flat form for easy cleaning and airing. With this construction the bag is assured long life and provides a clean creel for fresh caught fish.

When assembling the bag the component wall portions may be folded together and the tabs 32 lined up with the flaps 18 (FIG. 5) and the lace may be threaded through the eyelets 24 and 34 and knotted and held in a seemingly obvious manner. As stated before the openings in the bottom wall are for drainage and also for airing. With this bag, which has been constructed and used experimentally, no smelly unclean container has to be coped with. Fish can be put into the bag at the front end without unfastening the fasteners and yet the bag is closed.

With the construction used all work during the manufacturing of the bag can be done while the material is laying out flat. Where laces are shown so-called zippers or equivalent slide fasteners (not shown) might, of course, be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An easy-to-clean live fish containing and transporting creel for use by an angler comprising a tough canvas bag provided with a shoulder strap and embodying a front wall, a correspondingly constructed back wall opposed to said front wall, a relatively narrow bottom wall connecting the bottom portions of the front and back walls and provided with drainage holes, and corresponding readily separable and connectible end walls carried by and connecting the respective end portions of the front and back walls, said end walls, when disconnected, permitting all of the walls to be spread out flatwise for drying and cleaning the surfaces, particularly the interior surfaces, of said walls, the upper edge portions of the front and back walls providing a mouth, portions of said upper edges being provided with widely spaced quick separable fasteners, said fasteners being paired and cooperatively arranged so that spaces between said fasteners when fastened and spaces between the outermost fasteners and said end walls provide relatively large freely usable openings which are designed and adapted to allow fish to be passed through the openings into the bag, said fasteners comprising turn-buttons on one wall fitting removably into and through complemental aligned grommets provided therefor on the opposed wall, said grommets constituting keepers for the turnbuttons when the latter are turned to predetermined wall-connecting and retaining positions, each end wall comprising a pair of relatively narrow duplicate overlapping flaps having alignable eyelets, said bottom wall being provided at transverse ends thereof with upturned tabs, said tabs overlapping interior bottom portions of the respectively adjacent end walls and also having eyelets, and a readily applicable and removable lace for each end wall and the tab cooperating therewith, said lace being passed through the eyelet in the tab and then through the cooperating eyelets carried by said flaps, the laces and the eyelets provided therefor serving to readily connect the walls to provide the bag and also permitting the walls to be disconnected for opening up said bag and drying and cleaning the walls.

References Cited in the file of this patent

UNITED STATES PATENTS

| | | |
|---|---|---|
| D. 157,266 | Kiernan | Feb. 14, 1950 |
| 279,589 | Onderdonk | June 19, 1883 |
| 722,801 | Bourne | Mar. 17, 1903 |
| 1,225,001 | Bartlett | May 8, 1917 |
| 2,432,001 | Fisler | Dec. 2, 1947 |
| 2,712,337 | Tremblay | July 5, 1955 |
| 2,843,170 | Frankfurt | July 15, 1958 |

FOREIGN PATENTS

| | | |
|---|---|---|
| 726,497 | France | Mar. 7, 1932 |